United States Patent
Murphy et al.

[11] Patent Number: 6,138,251
[45] Date of Patent: Oct. 24, 2000

[54] METHOD AND SYSTEM FOR RELIABLE REMOTE OBJECT REFERENCE MANAGEMENT

[75] Inventors: Declan J. Murphy, San Francisco; Andrew G. Tucker, Los Altos; Madhusudhan Talluri, Fremont, all of Calif.; Jose Bernabeu-Auban, Valencia, Spain; Yousef A. Khalidi, Cupertino, Calif.

[73] Assignee: Sun Microsystems, Inc., Palo Alto, Calif.

[21] Appl. No.: 08/884,978

[22] Filed: Jun. 30, 1997

[51] Int. Cl.[7] ...................................................... H02H 3/05
[52] U.S. Cl. ................................ 714/41; 714/40; 714/41; 714/42; 714/748; 703/303; 703/203; 703/224; 703/239; 711/1; 711/101; 711/170; 711/196; 712/28
[58] Field of Search .............................. 714/41, 18, 748, 714/749, 40, 42, 710; 709/303, 203, 224, 239, 223; 710/34; 711/1, 101, 170, 196; 712/28

[56] References Cited

U.S. PATENT DOCUMENTS

| | | | |
|---|---|---|---|
| 3,919,484 | 11/1975 | Maxemchuck | 179/15 |
| 4,679,186 | 7/1987 | Lea | 370/14 |
| 5,113,519 | 5/1992 | Jonson et al. | 395/600 |
| 5,446,901 | 8/1995 | Owicki et al. | 395/700 |
| 5,712,968 | 1/1998 | Nakayama et al. | 395/182.02 |
| 5,724,503 | 3/1998 | Kleiman et al. | 395/185.1 |
| 5,748,892 | 5/1998 | Richardson | 395/200.3 |
| 5,752,028 | 5/1998 | Ellacott | 395/614 |
| 5,808,911 | 9/1998 | Tucker et al. | 364/559 |
| 5,845,082 | 12/1998 | Murakami | 395/200.56 |
| 5,887,127 | 5/1999 | Saito et al. | 395/182.02 |
| 5,963,945 | 10/1999 | Pal | 707/10 |

OTHER PUBLICATIONS

Microsoft "Microsoft Windows NT Server Cluster Strategy: High Availability and Scalability With Industry–Standard Hardware" (Microsoft, Business Systems Division White Paper).

*Primary Examiner*—Ayaz R. Sheikh
*Assistant Examiner*—Firmin Backer
*Attorney, Agent, or Firm*—Pennie & Edmonds LLP

[57] ABSTRACT

The present invention pertains to a system and method for tracking object references in an object-oriented computing system including a number of independent computing nodes interconnected by a communications link. The reference counting mechanism tracks references to an object through the use of a messaging protocol. A server node keeps a foreign reference count for each of its objects. The foreign reference count indicates the number of remote nodes having a reference to one of the servers objects. A server node increments the foreign reference count for each object reference that it exports prior to sending it to an intended client node. A client node will send a message to the server node when it has already received the exported object reference and in response to this message, the server node decrements the appropriate foreign reference count. When a client node receives an object reference from another client node, the receiving client node will message the appropriate server node that the receiving client node has a reference to the object. In response, the server node increments the appropriate foreign reference count. The reference counting mechanism utilizes a node failure protocol in order to accurately track the foreign reference counts in light of node failures.

34 Claims, 8 Drawing Sheets

METHOD AND SYSTEM FOR RELIABLE REMOTE OBJECT REFERENCE MANAGEMENT

The present invention relates generally to object-oriented operating systems and particularly to a system and method for reliable remote object reference management.

BACKGROUND OF THE INVENTION

A current trend in the computer industry is the interconnection of a number of independent computing nodes connected by a high-speed communications link. Each computing node is associated with one or more domains, where each domain represents a process having its own address space. Each domain contains a number of objects that can be invoked by other domains either in the same node as the referenced object or in different nodes connected to the node containing the referenced object.

Routinely, an object manager safely destroys object references that are no longer used and reclaims their resources. However, the object manager needs to know when there are no longer any outstanding references to the object in order to safely reclaim the associated resources. Typically, a reference counting mechanism is used to track the nodes and domains that reference a particular object. Occasionally, node failures occur which adversely affect the accuracy of the reference counting mechanism. Accordingly, there needs to be a reference counting mechanism that accurately tracks object references in light of node failures.

SUMMARY OF THE INVENTION

In summary, an embodiment of the present invention pertains to a reference counting mechanism that tracks references to an object in an efficient manner and that can maintain an accurate track of the references in light of node failures. The reference counting mechanism utilizes an asynchronous messaging protocol and two counting mechanisms to efficiently track the various references to an object within the distributed system. A node failure processing protocol is used to aid the reference counting mechanism in tracking the operational nodes having object references.

The distributed system includes independent computing nodes that are interconnected via a communications link. The nodes represent client and/or server computers that do not share memory. Each server node is associated with a number of objects whose methods are resident in the node. A server node can send to one or more client nodes references to its objects. A client node once having obtained an object reference can send the object reference to another node.

Each server node maintains a local reference count and a foreign reference count for each object. The local reference count tracks references to the object within the node. The foreign reference count tracks references to the object from other nodes. Before an object reference is exported from a server node to another node, the server node increments the associated foreign reference count. When the local and foreign reference counts for an object indicate that no outstanding references exist for the object, the object's resources can be reclaimed.

In addition, each client node maintains a local reference count and a foreign reference count for each object reference. The local reference count tracks the number of references to an object reference within the node.

The foreign reference count tracks the number of nodes that the client node has exported the object reference to. When the local and foreign reference count for an object reference indicates that no outstanding references exist for the object, the client node sends a message to the server node associated with the object. In response to this message, the server node decrements its foreign reference count to the object. In addition, the client node can reclaim the object reference's resources.

When a node receives an object reference that presently resides in the node, the, receiving node sends a message indicating receipt to the sending node. In response to receiving the message, the sending node decrements the foreign reference count associated with the object reference. Furthermore, when a node receives an object reference from another client node, the receiving node sends a message to the server node associated with the object reference. In response to receiving the message, the server node increments the appropriate foreign reference count.

A membership monitor procedure is used to determine when one of the nodes fails or becomes non-operational. When a node failure is detected, the membership monitor procedure initiates a node failure protocol. The node failure protocol aids the reference counting mechanism in each node to accurately track the operational nodes that possess an object reference to one of its objects.

BRIEF DESCRIPTION OF THE DRAWINGS

Additional objects and features of the invention will be more readily apparent from the following detailed description and appended claims when taken in conjunction with the drawings, in which:

DESCRIPTION OF THE PREFERRED EMBODIMENT

Overview

The present invention pertains to a fault tolerant reference counting mechanism for tracking remote references to an object. The present invention is embodied in a computing system including a cluster of independent computing nodes. One or more client nodes can reference one or more objects whose methods are resident in a server node. The object reference counting mechanism of the present invention tracks the remote node references in order to determine when the object is no longer needed. On occasion, a node becomes inoperable or fails. In this instance, the object reference counting mechanism needs to alter its count in order to account for the failed node.

A node can only invoke the methods associated with an object if it has been given a reference to the object. A server node stores the methods associated with an object and controls which nodes have access to its objects. A server node enables a client node access to an object by exporting to the client node a reference to the object. The exported object reference enables the client node to invoke the object. Once the client node has been granted access to the object, it can export the object reference to other client nodes. In an embodiment of the present invention, the object reference is an xdoor which will be described in more detail below.

Each node has a local and foreign reference count for each object that is accessed by a remote node. The local reference count tracks references to the object within the node. A server node's foreign reference count tracks each client node having a reference to one of its objects. A client node's foreign reference count tracks the number of nodes that the client node has exported an object reference to.

The reference counting mechanism of the present invention utilizes a messaging protocol to accurately track the remote nodes that can reference a particular object. The messaging protocol is initiated by a node exporting an object reference to another node. One or more asynchronous messages are transmitted between the nodes involved in the transmission. The messages are used to ensure that the associated server node's foreign reference count accurately tracks the nodes referencing the exported object.

In the event of a node failure, a node failure protocol is performed to ensure that the foreign reference counts accurately reflect the operational nodes that reference an object. A node failure primarily affects the server node's foreign reference count. The reference counting procedure will ensure that each foreign reference count will not include a reference by a failed or inoperable node.

The reference counting mechanism of the present invention can utilize the local reference counting mechanism described in U.S. patent application entitled "A System and Method for Remote Object Resource Management," Ser. No. 08/879,151 filed Jun. 19, 1997, which is hereby incorporated by reference.

Computer Architecture

Figure 1:
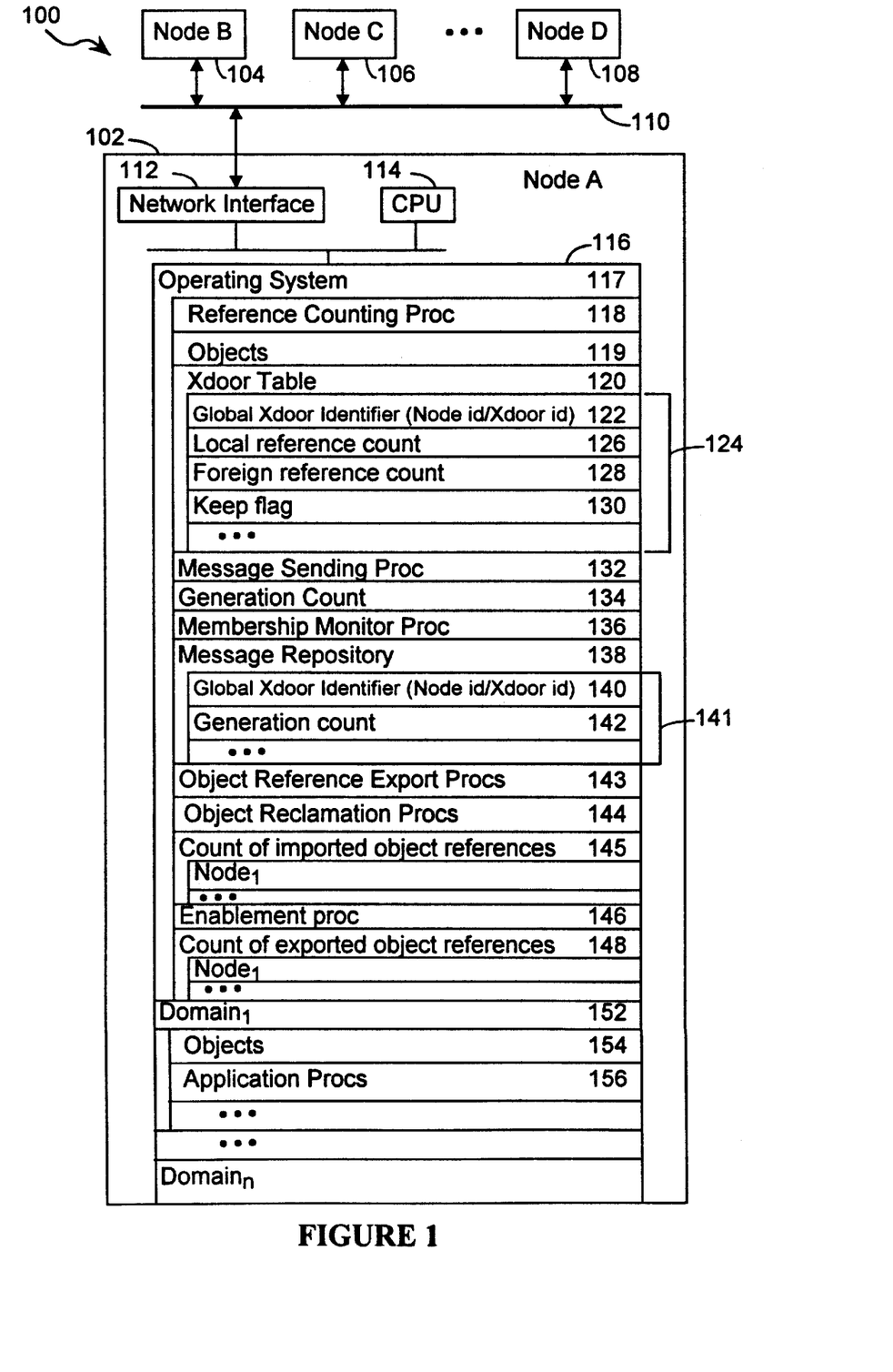
FIG. 1 is a block diagram of a computer system incorporating the preferred embodiments of the present invention.

Referring to FIG. 1, there is shown a distributed computer system 100 including a cluster of computing nodes 102, 104, 106, and 108. Each computing node 102, 104, 106, and 108 represents an independent client/server computer that is interconnected via a communications link 110. Each node can be considered a client and/or a server computer. A client computer is associated with a node that invokes an object. A server computer is associated with a node that stores the object's methods. In certain cases, the client and server computer will be the same node. In other cases, the client and server computers are distinct nodes.

The communications link 110 generically refers to any type of wire or wireless link between computers, such as but not limited to a local area network, a wide area network, or a combination of networks. The client/server computers use the communications link 110 to communicate with each other.

Each node 102, 104, 106, 108 has a network interface 112, a CPU 114, and a memory 116. The memory 116 of each node includes an operating system 117 (or kernel) and one or more domains 152. A domain 152 is defined to be a process with its own address space. A domain 152 can have multiple threads of execution (usually called threads) that can execute application procedures 156. Each domain 152 has one or more objects 154 associated with it. In addition, the operating system 117 also has objects 119.

In a preferred embodiment, the operating system or kernel 117 is the Solaris MC operating system, which is a product of Sun Microsystems, Inc. Background information on the Solaris MC operating system can be found in "Solaris MC: A Multi-Computer OS," Technical Report SMLI TR-95-48, November 1995, Sun Microsystems, which is hereby incorporated by reference. However, it should be noted that the present invention is not constrained to this particular operating system.

Each thread can request the execution of an object (i.e., object's method). The location of the object is transparent to the thread. The object can reside in one of several locations. It can reside within the same domain as the requesting thread, in a different domain as the requesting thread but within the same node as the requesting thread, or in the domain of a remote node.

Each object that is accessible by a remote node has an xdoor 124. An xdoor 124 is a kernel state entity that is used to represent an object throughout the distributed system. Each xdoor 124 associated with a node is stored in an xdoor table 120. The xdoor 124 includes a global xdoor identifier 122) a local reference count 126, a foreign reference count 128, a keep flag 130, as well as other information. A node has a server xdoor for those objects whose methods are resident within the node and a client xdoor for each object whose methods reside in a remote node.

The global xdoor identifier 122 is used to uniquely identify the object within the system 100 and consists of a node identifier and an xdoor identifier. The xdoor identifier uniquely identifies an object within a node and the node identifier is used to uniquely identify the node within the system 100. The combination of an xdoor identifier and a node identifier uniquely identifies an object within the distributed system 100.

The local reference count 126 associated with an xdoor 124 is used to track the number of local user and kernel domains that hold references to the associated object. The foreign reference count 128 is used to track references to the object by remote nodes. The foreign reference count 128 does not include a count for the node that stores the object's methods. The local and foreign reference counts are used to track the number of outstanding references to an object. When both of these counts are zero, the xdoor 124 associated with the object can be deleted as well as other resources that the associated object utilizes.

The keep flag 130 is used to signify whether or not the xdoor 124 for the object is to be deleted. When the keep flag 130 is set, the xdoor 124 is retained. Otherwise, when the keep flag 130 is cleared, the xdoor 124 can be deleted or reclaimed by an object reclamation procedure 144.

The operating system 117 includes additional data and procedures for use in tracking object references. The operating system 117 includes a reference counting procedure 118, a message sending procedure 132, a generation count 134, a membership monitor procedure 136, a message repository 138, an object reference export procedure 143, a count of imported or received object references 145, an enablement procedure 146, a count of exported object references 148, as well as other information. The reference counting procedure 118 is used to track local and foreign object references through the messaging protocol. The message sending procedure 132 sends one or more messages between the nodes within the system 100. The generation count 134 signifies the current generation that the operational nodes in the system are executing under. The generation count 134 is used in processing a node failure. A membership monitor procedure 136 is used to detect node failures and to coordinate the node failure processing protocol. The object reference export procedure 143 is used to export an object reference from one node to another node. The exported object reference is transmitted as a message which is described in more detail below. The enablement procedure 146 is used to disable and enable the object reference export procedure 143.

The message repository 138 stores one or more messages 141 that are transmitted between nodes. The messages are used to export an object reference and to communicate between various nodes in order to accurately track object references. Each of these messages includes a global xdoor identifier 140 which includes a node identifier and xdoor identifier associated with a particular object reference. In addition, each message also includes a generation count 142.

All messages transmitted between nodes are transmitted asynchronously. By asynchronous transmission it is meant that the messages are scheduled for transmission without waiting for confirmation of their completed transmission. In this manner, the reference counting procedure 118 can tolerate message delays. In an embodiment of the present invention, messages that are to be routed to a particular node can be collected and transmitted in one or more batches. In addition, the messages need not be received in any particular order.

Additionally, each node keeps track of the number 145 of object references that it has received from each other node and the number 148 of object references that it has exported to each other node. These counts are accumulated for each node in the cluster.

The infrastructure that supports the reference counting mechanism has been described. The discussion now turns to the reference counting message protocol and the node failure protocol used to track remote object references.

Reference Counting Message Protocol

Figure 2A:
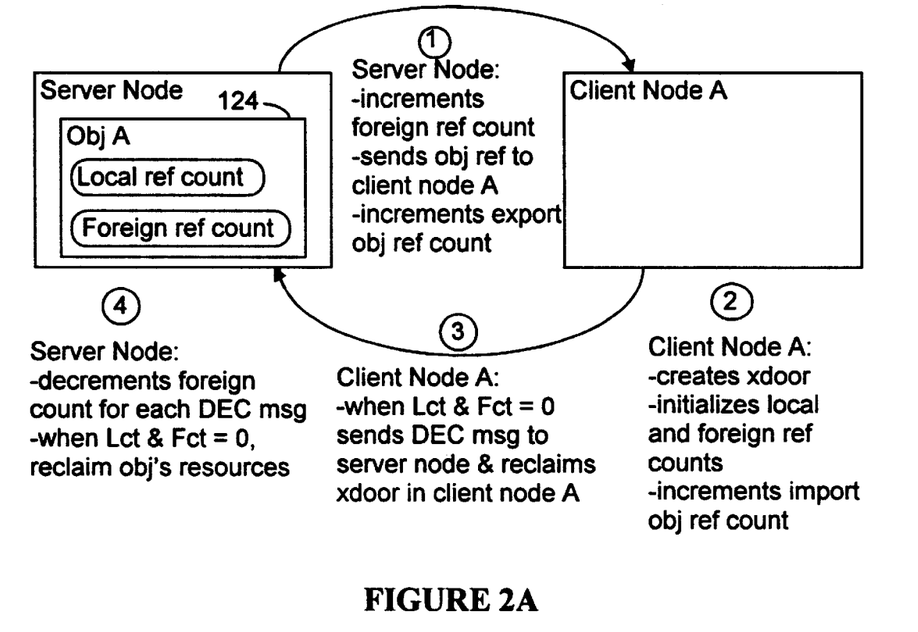
FIGS. 2A–2E are schematic representations of the messaging protocol used to track remote object references.
Figure 2B:
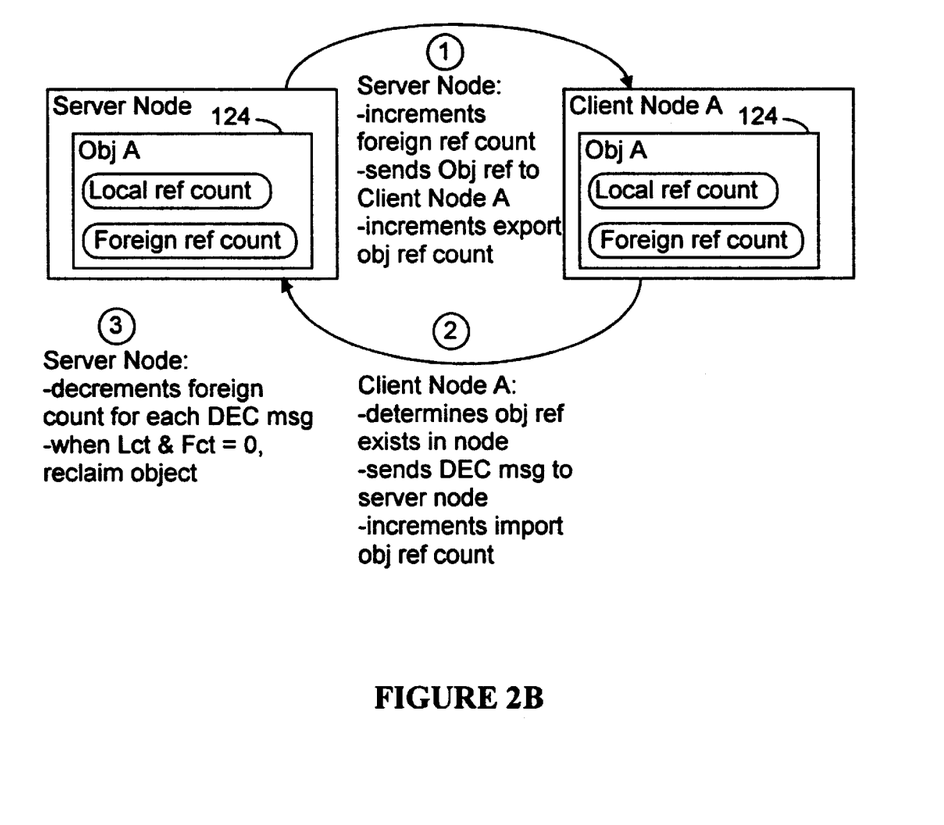
Figure 2C:
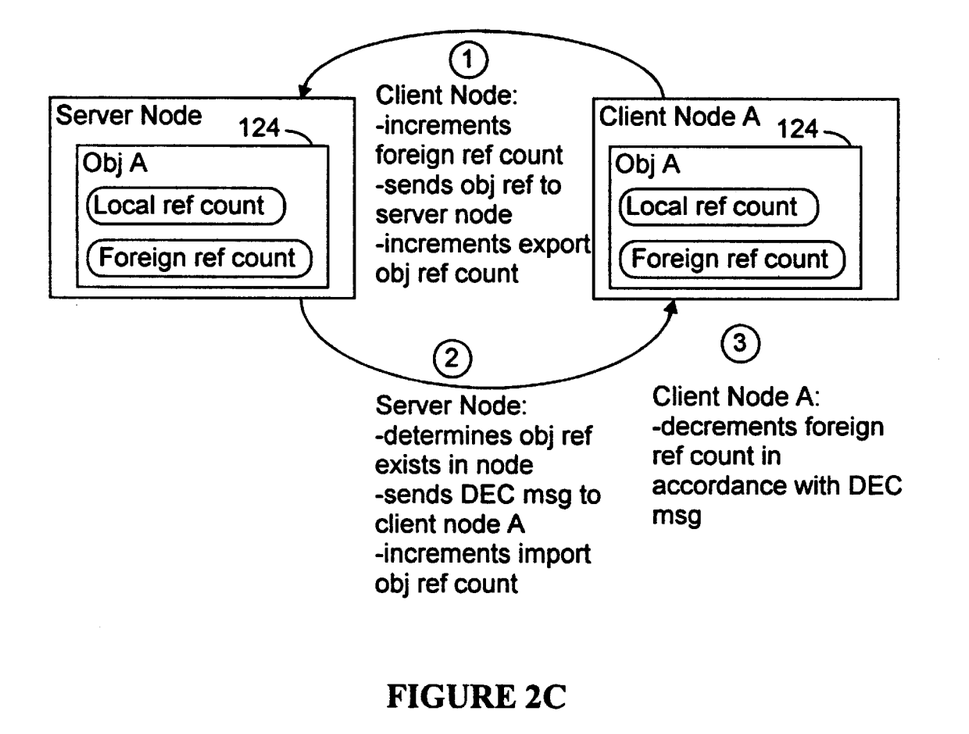
Figure 2D:
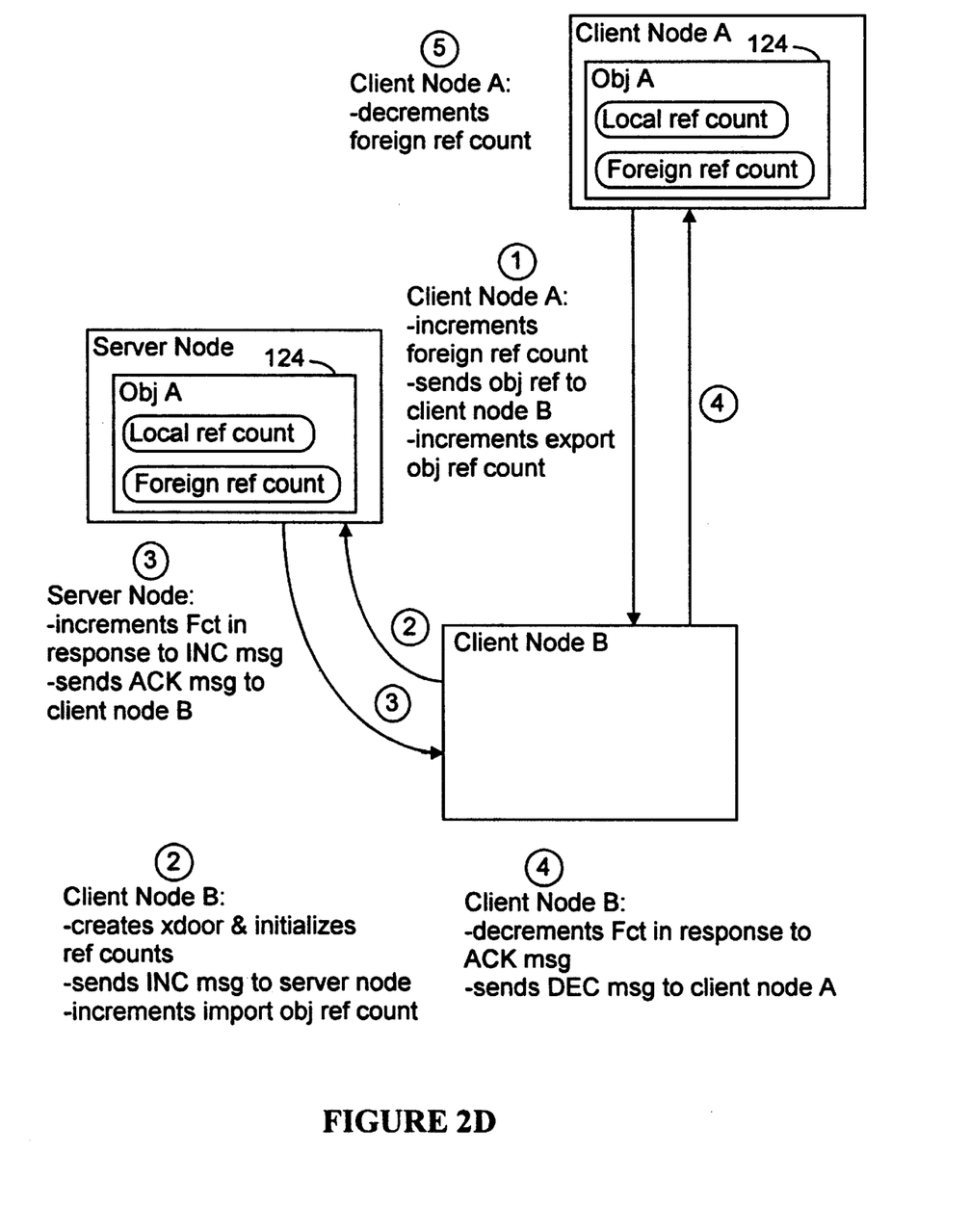
Figure 2E:
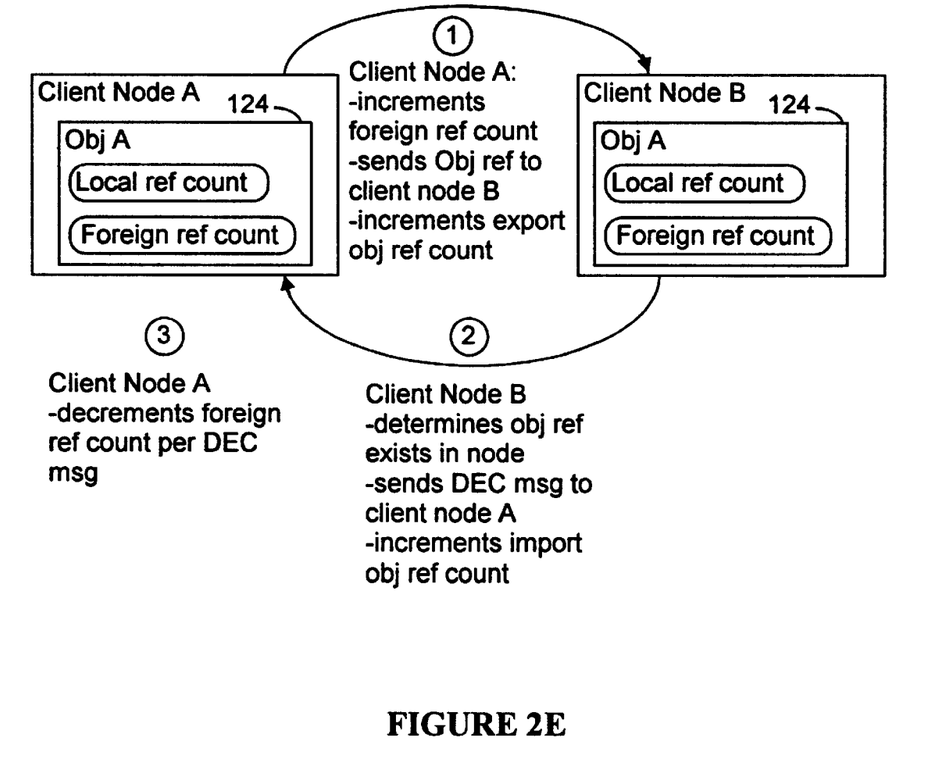

FIGS. 2A–2E illustrate the reference counting message protocol used by the reference counting procedure 118. FIG. 2A illustrates the case where a server node initially exports an object reference to a client node. FIG. 2B illustrates the case where the server node exports an object reference to a client node that already has the object reference. FIG. 2C illustrates the case where a client node exports to the server node an object reference. FIG. 2D illustrates the case where a client node exports an object reference to another client node. FIG. 2E illustrates the case where the client node exports an object reference to another client node that already has the object reference.

Referring to FIG. 2A, a server node having object A transmits an object reference to object A to client node A. In one embodiment of the present invention, the xdoor 124 represents the object reference that is exported to a client node. Before the server node exports the xdoor, the server's foreign reference count 128 for the xdoor 124 is incremented by the reference counting procedure 118. In addition, the server's count of exported object references 148 is incremented. The xdoor 124 is transmitted via a message by the object reference export procedure 143 (step one).

Client node A receives the message and searches its xdoor table 120 to determine if it already has the exported xdoor 124. If the received xdoor 124 does not exist in client node A's xdoor table 120, client node A creates an xdoor 124 entry for it and initializes the xdoor's local 126 and foreign 128 reference counts. The local reference count 126 is initialized to one and the foreign reference count 128 is initialized to zero. In addition, client node A's count of imported object references 145 is incremented (step two).

When client node A is finished with the object, the message sending procedure 132 in client node A transmits a decrement (DEC) message to the server node. This occurs when the xdoor's local reference count 126 (Lct) and foreign reference count (Fct) 128 are both zero. In addition, the object reclamation procedure 144 in client node A deletes its xdoor 124 for the object as well as other resources related to this object (step three).

The server node receives the DEC message and the reference count procedure 118 decrements the foreign reference count 128 for the associated object. The DEC message will include the global xdoor identifier 122 for the associated object. The object reclamation procedure 144 in the server node will eventually delete its xdoor 124 for the object when the server xdoor's local 126 and foreign 128 reference counts become zero. In addition, the server node can also delete other resources associated with the object (step four).

FIG. 2B illustrates the case where a server node exports an object reference to a client node that already has the exported xdoor 124. The server node increments the associated foreign reference count 128 and the count of exported object references 148 (step one). The client node determines that it has already received the object reference by searching its xdoor table 120 and locating an entry matching the exported xdoor (step two). In this case, the client node sends a DEC message to the server node. In either case, the client node increments its count of imported object references 145 (step two). In response to the DEC message, the server node decrements the foreign reference count 128 for the xdoor 124 associated with the DEC message (step three). The xdoor 124 and object resources are eventually reclaimed when the server xdoor's local 126 and foreign 128 reference counts are both zero (step three).

FIG. 2C illustrates the case where the client node exports an object reference to a server node that already has the exported xdoor (step one). The client node increments the corresponding foreign reference count 128 and its count of exported object references 148 (step one). The server node will determine that it already has the exported xdoor when it searches its xdoor table 120 and finds an xdoor entry matching the received xdoor (step two). The xdoor entry in the server node's xdoor table 120 and the xdoor in the received message will have the same global xdoor identifier 122. In this case, the server node sends a DEC message to the client node (step two). In addition, the server node increments its count of imported object references 145 (step two). In response to the DEC message, the client node decrements its foreign reference count 128 for the object (step three).

FIG. 2D illustrates the case where the client node exports an object reference to another client node. In this case, the server node needs to be informed of the additional client node reference in order for its foreign reference count 128 to include the additional reference by the new client node.

Before client node A exports the object reference, the reference counting procedure 118 increments the foreign reference count 128 associated with the corresponding xdoor 124 and increments its count of exported object references 148 (step one).

Client node B receives the xdoor and creates an xdoor 124 entry for it in its xdoor table 120, initializes the xdoor's local 126 and foreign 128 reference counts, and its count of imported object references 145 (step two). Client B detects that the xdoor export was received from a different node than the xdoor's server, and responds by invoking its client to client xdoor import protocol. The local reference count 126 is initialized to one and the foreign reference count 128 is also initialized to one. In addition, client node B transmits to the server node an increment (INC) message (step two). In response to the INC message, the server node increments its foreign reference count 128 for the referenced object and transmits an acknowledgment (ACK) message back to client node B (step three). In response to the ACK message, client node B's foreign reference count decrements its foreign reference count 128 for the xdoor and sends a DEC message to client node A (step four). Client node A, in turn, decrements its foreign reference count 128 for the associated xdoor (step five). At the completion of this messaging protocol, the server node will have one count for client node A and one count for client node B. Client nodes A and B will not have a foreign reference count 128 for object A.

In an embodiment of the present invention, a node can acknowledge each received INC message by sending a corresponding ACK message. In another embodiment, the transport layer of the operating system transmits messages between nodes in batches. Thus, several INC messages may be transmitted from one node to another in a single message packet. A node can send one ACK message to a particular node acknowledging several previously received INC messages that have not yet been acknowledged. Further, the transport layer will not transmit an INC message from one node to another until it has received an ACK message acknowledging all outstanding INC messages previously sent to that other node.

FIG. 2E illustrates the case where client node A transmits an object reference to client node B that already has the object reference (step one). Client node A increments the associated foreign reference count 128 and client node A's count of exported object references 148 (step one). In this case, client node B will determine that it already has the reference and will transmit a DEC message to client node A (step two). In addition, client node B increments its count of imported object references 145 (step two). In response to the DEC message, client node A will decrement its foreign reference count 128 for the object reference accordingly (step three).

The reference counting messaging protocol has been described above. Attention now turns to the manner in which the reference counts are adjusted when there is a node failure.

Node Failure Protocol

Figure 3A:
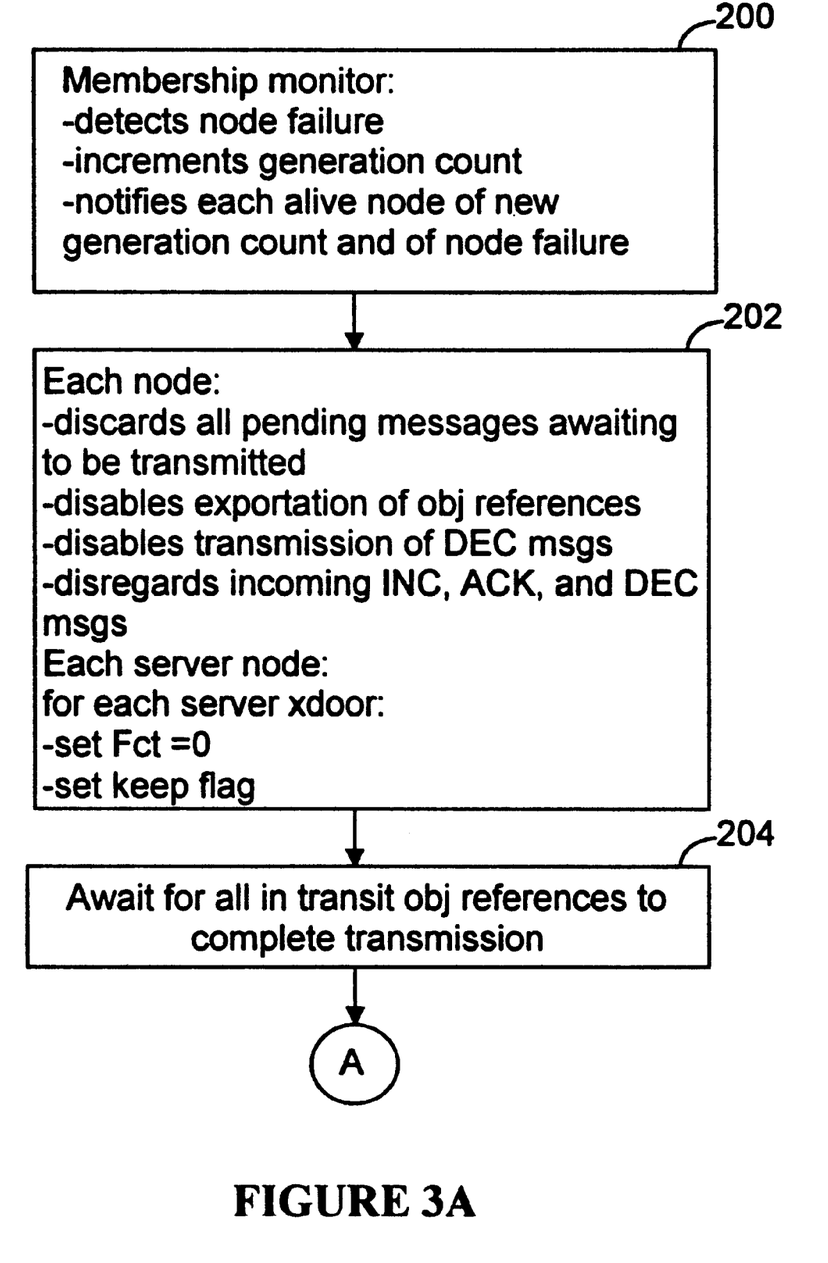
FIGS. 3A–3B are flow charts illustrating the steps used to readjust the reference counting mechanism when a node failure occurs.
Figure 3B:
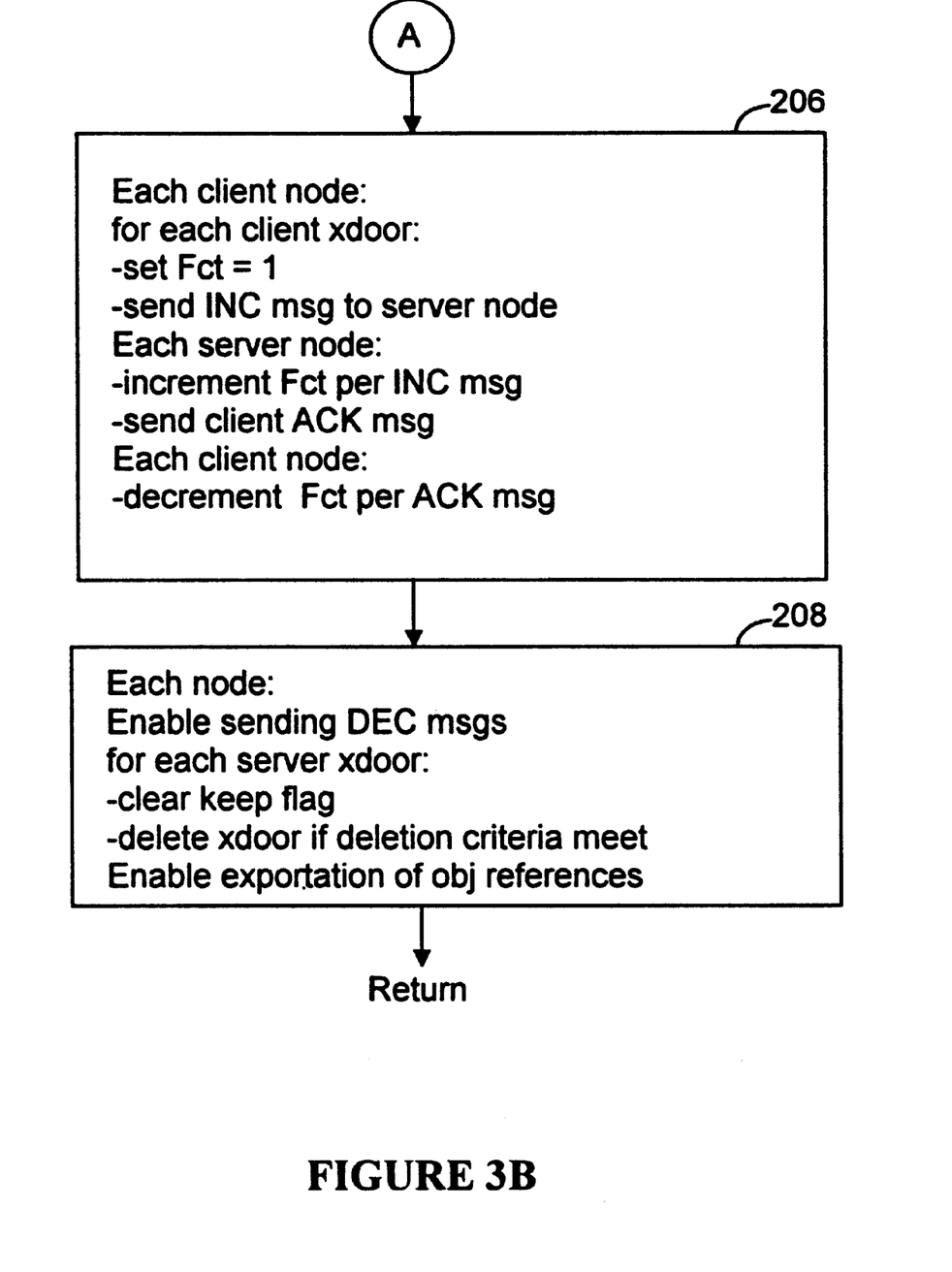

FIGS. 3A–3B illustrate the steps used to handle a node failure, otherwise known as the node failure protocol. A node failure is detected by the membership monitor procedure 136. The membership monitor procedure 136 is a distributed procedure that resides in each node. The membership monitor procedures 136 of each node are in communication with one another and can detect when a node is non-operational. When this occurs, the membership monitor procedures 136 will increase the generation count in all the operational nodes in a coordinated manner and inform each node of the identity of the failed node or nodes (step 200).

Upon notification of a node failure, the membership monitor procedure 136 coordinates with each node to perform the following tasks. First, each node discards all pending messages that are waiting to be transmitted. In addition, the enablement procedure 146 in each node is instructed to temporarily disable the exportation of any further object references. In addition, each node temporarily disables the transmission of any further DEC messages and discards all incoming ACK, INC, and DEC messages having a generation count 142 that does not match the current generation count 134. Further, the reference counting procedure 118 in each server node will set each server xdoor's foreign reference count 128 to one and set its associated keep flag 130 (i.e., keep flag="1") (step 202).

Next, each node is instructed by the membership monitor procedure 136 to wait to receive all in transit object references. Each node will send a message, to every node that it has sent an object reference to, with a count of the number of object references 148 that it has previously transmitted to the node. Each node also retains a count of the number of object references that it has received 145 from each particular node. A node will wait to receive each reference that has been transmitted to it by an operational node. This occurs when the count of imported object references 145 for a particular node equals the count of the exported object references 148 received from the same node (step 204). When a client node receives an in transit object reference, it processes the received object reference as discussed above.

Next, the membership monitor procedure 136 instructs how the reference counting procedure 118 in each node is to set the foreign reference count 128 for each server xdoor 124 in order to accurately reflect the operational nodes having an object reference for a particular object. This is accomplished by having each client node set each client xdoor's foreign reference count 128 to one. In addition, the message sending procedure 132 in each client node will transmit an INC message from each client xdoor to the associated server node. The reference counting procedure 118 in each server node will increment its foreign reference count 128 in response to the INC message and transmit to the client node an ACK message. In response to the ACK message, the reference counting procedure 118 in each client node will decrement its foreign reference count 128. When all the ACK messages have been processed, each server node will have an accurate count of the number of remote nodes accessing each of its objects (step 206).

After all INC messages sent by each alive node have been acknowledged with an ACK message, the next step is to resume normal processing. At an appropriate time when the membership monitor procedure 136 has determined that normal processing is to resume, each node is instructed to resume sending DEC messages. In addition, the reference counting procedure 118 in each node clears the keep flag 130 for each server xdoor 124 and the enablement procedure 146 resumes the exportation of object references to other nodes. Furthermore, if there are no longer any references, local or foreign, for a particular object, the xdoor 124 for the object can be deleted as well as other associated resources (step 208).

Alternate Embodiments

While the present invention has been described with reference to a few specific embodiments, the description is illustrative of the invention and is not to be construed as limiting the invention. Various modifications may occur to those skilled in the art without departing from the true spirit and scope of the invention as defined by the appended claims.

The present invention is not limited to the computer system described in reference to FIG. 1. It may be practiced without the specific details and may be implemented in various configurations, or makes or models of distributed computing systems, tightly-coupled processors or in various configurations of loosely-coupled microprocessor systems.

Further, the method and system described hereinabove is amenable for execution on various types of executable mediums other than a memory device such as a random access memory. Other types of executable mediums can be used, such as but not limited to, a computer readable storage medium which can be any memory device, compact disc, or floppy disk.

What is claimed is:

1. A method for tracking references to an object in a computer system including at least one server node and at least one client node, said method comprising the steps of:
   providing in each said server node a plurality of objects and object references, each object associated with a server-side foreign reference count indicating a number of client nodes having a reference to the object, each object reference associated with a select one of said objects resident in a particular server node;
   incrementing a first server-side foreign reference count associated with a first object reference;
   exporting from a first server node said first object reference to a first client node;
   exporting from said first client node said first object reference to a second client node;
   upon receiving said exported object reference, said second client node sending said first server node a first message indicating receipt of said first object reference; and
   upon receipt of said first message, incrementing said first server-side foreign reference count.

2. The method of claim 1, further comprising the steps of:
   acknowledging to said second client node, receipt of said first message;
   decrementing in said second client node a second foreign reference count associated with said first object reference;
   indicating to said first client node receipt of said acknowledgment; and
   upon receipt of said indication, decrementing in said first client node a third foreign reference count associated with said first object reference.

3. The method of claim 1, further comprising the steps of:
   upon receiving an object reference in a client node already having the received object reference, sending a second message to a server node associated with the received object reference, said second message indicates that the receiving client node already has the received object reference; and
   upon receiving said second message, decrementing a server-side foreign reference count associated with the object of the second message.

4. The method of claim 1, further comprising the steps of:
   providing in each client node, a client-side foreign reference count indicating a number of nodes to which the client node has exported an associated object reference;
   exporting from a third client node an object reference to a third server node having the object corresponding to the exported object reference;
   upon receiving said exported object reference, sending a third message to said third client node, said third message indicating that the third server node has said exported object reference; and
   upon receiving said third message, decrementing the client-side foreign reference count associated with the exported object reference.

5. The method of claim 4,
   said exporting step further comprising the step of:
   incrementing a foreign reference count in said third client node associated with said object reference.

6. The method of claim 4, further comprising the steps of:
   maintaining a client-side local reference count in each client node for each object reference, said client-side local reference count indicating a count of local references to an object within a client node;
   comparing a client-side local reference count and a client-side foreign reference count for an object reference;
   sending a fourth message responsive to the step of comparing to a server node associated with the object reference, said fourth message indicating that no outstanding references exist to the object reference by the client node; and
   upon receiving said fourth message, decrementing a server-side foreign reference count associated with the object in the fourth message.

7. The method of claim 6, further comprising the steps of:
   reclaiming resources associated with an object reference when the client-side local reference count of the object reference and client-side foreign reference count indicate no outstanding references to the object reference exist.

8. The method of claim 1, further comprising the steps of:
   maintaining a server-side local reference count in each server node for each object, said server-side local reference count indicating a count of local references to an object within the server node; and
   reclaiming resources associated with an object when the server-side local reference count of the object and server-side foreign reference count indicate no outstanding references to the object exist.

9. The method of claim 6,
   wherein said first, third, and fourth messages are sent asynchronously.

10. The method of claim 3,
    wherein said second message is sent asynchronously.

11. A method for tracking references to an object in a computer system including at least one server node and at least one client node, said method comprising the steps of:
    a) providing in each said server node a plurality of objects and a plurality of object references, each said object reference associated with a select one of the objects resident in a particular server node;
    b) exporting from one or more server nodes, object references to one or more client nodes;
    c) maintaining in each server node a server-side foreign reference count for each object, each server-side foreign reference count indicating a number of client nodes having a reference to an associated object;
    d) detecting a node failure in at least one client node; and after the detecting of a node failure performing the steps of:
    e) disabling temporarily each server node from exporting object references;
    f) reinitializing each server-side foreign reference count to a fixed, predefined starting value;
    g) waiting for all in transit object references to arrive at an intended client node;
    h) sending a first message from each client node having an object reference to a server node having an object associated with the object reference;
    i) upon receiving said first message, incrementing a server-side foreign reference count associated with the object reference in said first message; and
    j) when each server node receives all intended first messages, enabling each server node to export object references to one or more client nodes.

12. The method of claim 11,
said step g further comprising the steps of:
  maintaining in each node a first count representing a number of object references exported to other nodes and a second count representing a number of object references received from another node;
  sending to each node a second message indicating a number of object references exported; and
  upon receiving each said second message, waiting to receive the number of object references indicated in the second message.

13. The method of claim 11, further comprising the steps of:
  said step b further comprising the step of exporting from one or more client nodes, object references to other client nodes;
  said step c further comprising the step of maintaining in each client node a client-side foreign reference count for each object reference, said client-side foreign reference count indicating a number of receiving client nodes having received an object reference from an exporting client node; and
  said step e further comprising the step of disabling temporarily each client node from exporting object references.

14. The method of claim 12, further comprising the steps of:
  said step b further comprising the step of exporting from one or more client nodes, object references to other client nodes;
  said step c further comprising the step of maintaining in each client node a client-side foreign reference count for each object reference, said client-side foreign reference count indicating a number of receiving client nodes having received an object reference from an exporting client node; and
  said step e further comprising the step of disabling temporarily each client node from exporting object references.

15. The method of claim 11, further comprising the steps of:
  providing a local reference count for each object in a server node, said local reference count tracking local references to an object within a server node; and
  reclaiming resources associated with an object when an object's associated local reference count and foreign reference count indicate there are no longer any outstanding references to an object.

16. A computer system including one or more client nodes and at least one server node connected via a communications link, said system comprising:
  each said server node comprising:
    a plurality of objects, each object having a server-side foreign reference count indicating a number of client nodes having a reference to a particular object;
    a plurality of object references, each object reference associated with an object resident in a select one of said server nodes;
    a server-side object reference export mechanism having a capability to export a reference to one of said objects to one or more client nodes;
    a server-side reference counting mechanism having a capability to maintain each object's server-side foreign reference count;
  wherein said server-side reference counting mechanism increments a server-side foreign reference count associated with an object prior to the server-side object reference export mechanism exporting a reference to the object to a client node;
  each said client node comprising:
    a plurality of object references, each object reference associated with an object resident in a select one of said server nodes;
    a client-side object reference export mechanism having a capability to export an object reference to one or more other client nodes;
    a client-side message sending mechanism having a capability to send a first message to a server node associated with an exported object reference, wherein the exported object reference is received by a first client node and exported by a second client node, said first message indicating that said first client node has obtained the exported object reference;
  wherein said server-side reference counting mechanism receives said first message and increments a server-side foreign reference count associated with the object in said first message.

17. The system of claim 16,
  wherein said client-side message sending mechanism sends a second message to a server node associated with an exported object reference that was received by a client node from the server node, said second message indicating that the receiving client node already has the exported object reference; and
  wherein said server-side reference counting mechanism receives said second message and decrements a server-side foreign reference count associated with the object reference of the second message.

18. The system of claim 16, further comprising:
  each said client node comprising a plurality of client-side foreign reference counts, each client-side foreign reference count associated with each object reference, each client-side foreign reference count indicating a number of nodes that a client node has exported an associated object reference to;
  wherein said client-side object reference export mechanism increments a client-side foreign reference count associated with an exported object reference prior to exporting the object reference;
  said server node comprising a server-side message sending mechanism having a capability to send a third message to each client node that exports to a server node an object reference whose associated object resides in the receiving server node;
  wherein said client-side reference counting mechanism receives said third message and decrements a foreign reference count associated with the object reference of the third message.

19. The system of claim 18, further comprising:
  each said object reference associated with a client-side local reference count, said client-side local reference count indicating a number of references to an object reference within a client node;
  said client-side message sending mechanism sending a fourth message to a server node associated with an object reference whose associated client-side local reference count and client-side foreign reference count indicate that no outstanding references exist;
  said server-side reference counting mechanism receiving said fourth message and decrementing a server-side foreign reference count associated with the object of the fourth message.

20. The system of claim 19, further comprising:

each said client node further comprising a client-side object reclamation mechanism having a capability to reclaim resources associated with an object that is no longer referenced.

21. The system of claim 16, further comprising:

each said object associated with a local reference count, said local reference count indicating a number of local references to an object within a server node;

a server-side object reclamation mechanism having a capability to reclaim resources associated with an object that is no longer referenced.

22. The system of claim 16, wherein each said message sending mechanism sends each message asynchronously.

23. The system of claim 16, further comprising:

a node failure detection mechanism that determines when one or more of said nodes has failed;

wherein said server-side reference counting mechanism reinitializes each server-side foreign reference count to a fixed, predefined starting value upon notification of a node failure;

wherein said client-side message sending mechanism after detection of a node failure by the node failure detection mechanism, sends a fifth message to each server node whose object reference the client node has received;

wherein said server-side reference counting mechanism increments each server-side foreign reference count for each received fifth message.

24. The system of claim 23, further comprising:

each said node comprising an enablement mechanism having a capability to temporarily disable each respective object reference export mechanism upon notification of a node failure and having a capability to enable each respective object reference export mechanism when each node completes a node failure processing protocol.

25. A computer system having a plurality of computing nodes, said system comprising:

a plurality of objects, each said object stored in a select one of said computing nodes;

a plurality of object references, each object reference associated with an object stored in a first computing node and stored in a second computing node;

a plurality of foreign reference counts, each foreign reference count associated with an object and indicating a number of remote computing nodes referencing an object;

a reference counting mechanism having a capability to maintain each foreign reference count;

an object exportation mechanism having a capability to export object references to one or more remote computing nodes, wherein said object exportation mechanism increments a foreign reference count associated with an object corresponding to an exported object reference prior to exporting the exported object reference;

a node failure detection mechanism having a capability to detect when one or more of said computing nodes has failed;

an enablement mechanism having a capability to temporarily disable the object reference export mechanism upon notification of a node failure and having a capability to enable the object reference export mechanism when each node completes a node failure processing protocol; and a message sending mechanism having a capability mechanism, after detection of a node failure by the node failure detection mechanism, to send a first message for each object reference resident in a node, said first message sent to a node storing an object associated with the object reference;

wherein said reference counting mechanism, upon notification of a node failure, reinitializes each foreign reference count to a fixed, predefined starting value and upon receiving each said first message increments a corresponding foreign reference count.

26. The system of claim 25, wherein said message sending mechanism has the capability to send a second message for each object reference received in a first node where the first node already has the received object reference, said second message sent to a second node that sent the received object reference; and wherein said reference counting mechanism, upon receiving said second message, decrements the corresponding foreign reference count.

27. The system of claim 25, wherein said message sending mechanism has the capability to send a third message when a second node receives an object reference from a first node that does not store an object associated with the received object reference, the third message sent to a third node that stores the associated object; and wherein said reference counting mechanism, upon receiving said third message, increments the corresponding foreign reference count.

28. The system of claim 25, wherein said message sending mechanism sends each message asynchronously.

29. The system of claim 25, further comprising:

an object reclamation mechanism having the capability to reclaim resources associated with an object when said reference counting mechanism determines that no outstanding references remain to an object.

30. A computer program product for storing data for access by programs being executed on a data processing system including a plurality of nodes, the computer program product comprising a computer storage medium and a computer program mechanism embedded therein, the computer program mechanism comprising:

a plurality of objects, each said object stored in a select one of said computing nodes;

a plurality of object references, each object reference associated with an object stored in a first computing node and stored in a second computing node;

a plurality of foreign reference counts, each foreign reference count associated with an object and indicating a number of remote computing nodes referencing an object;

a reference counting mechanism having a capability to maintain each foreign reference count;

an object exportation mechanism having a capability to export object references to one or more remote computing nodes, wherein said object exportation mechanism increments a foreign reference count associated with an object corresponding to an exported object reference prior to exporting the exported object reference;

a node failure detection mechanism having a capability to detect when one or more of said computing nodes has failed;

an enablement mechanism having a capability to temporarily disable the object reference export mechanism upon notification of a node failure and having a capability to enable the object reference export mechanism when each node completes a node failure processing protocol; and a message sending mechanism having a capability after detection of a node failure by the node failure detection mechanism, to send a first message for each object reference resident in a node, said first message sent to a node storing an object associated with the object reference;

wherein said reference counting mechanism, upon notification of a node failure, reinitializes each foreign reference count to a fixed, predefined starting value and upon receiving each said first message increments a corresponding foreign reference count.

31. The mechanism of claim 30, wherein said message sending mechanism has the capability to send a second message for each object reference received in a first node where the first node already has the received object reference, said second message sent to a second node that sent the received object reference; and wherein said reference counting mechanism, upon receiving said second message, decrements the corresponding foreign reference count.

32. The mechanism of claim 30, wherein said message sending mechanism has the capability to send a third message when a second node receives an object reference from a first node that does not store an object associated with the received object reference, the third message sent to a third node that stores the associated object; and wherein said reference counting mechanism, upon receiving said third message, increments the corresponding foreign reference count.

33. The mechanism of claim 30, wherein said message sending mechanism sends each message asynchronously.

34. The mechanism of claim 30, further comprising:

an object reclamation mechanism having the capability to reclaim resources associated with an object when said reference counting mechanism determines that no outstanding references remain to an object.

\* \* \* \* \*